May 13, 1952 V. J. ZALANSKAS 2,596,637
GAUGE
Filed Jan. 15, 1947 2 SHEETS—SHEET 1

V. J. Zalanskas
Inventor

By Knowles
Attorneys

May 13, 1952 V. J. ZALANSKAS 2,596,637
GAUGE
Filed Jan. 15, 1947 2 SHEETS—SHEET 2
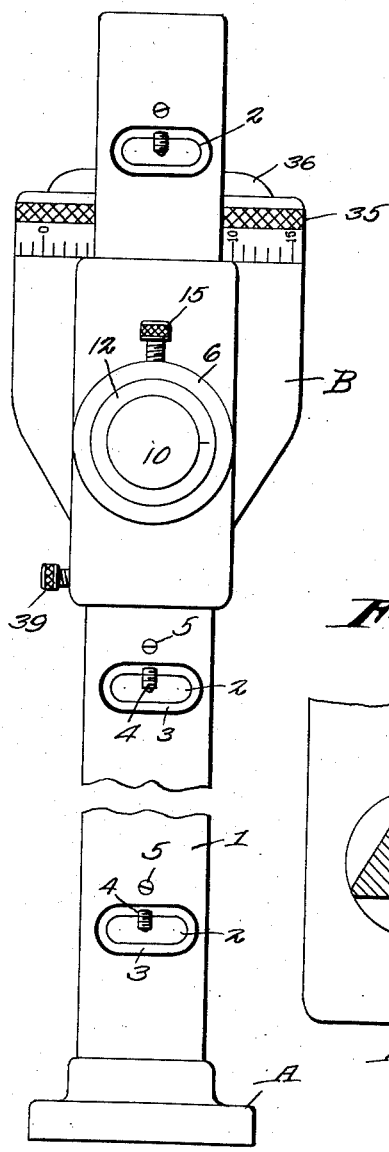
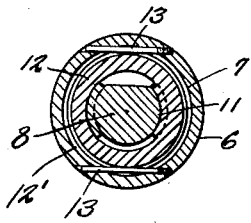
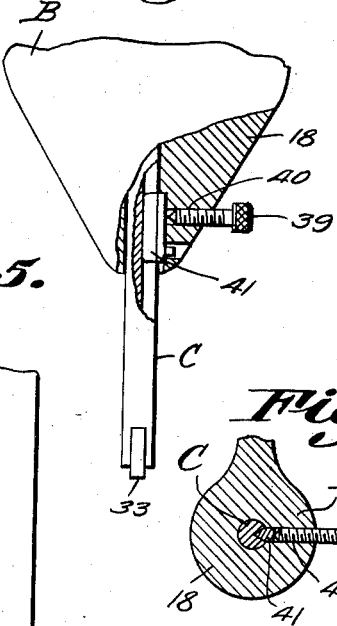
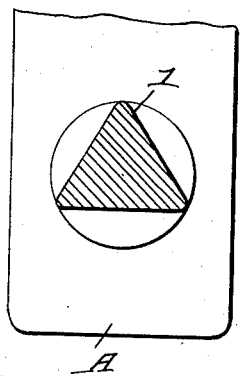
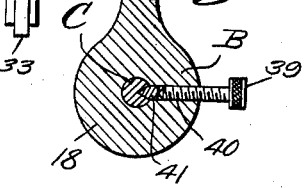
Inventor
V. J. Zalanskas
By C. A. Snow & Co.
Attorneys Patented May 13, 1952

2,596,637

UNITED STATES PATENT OFFICE 2,596,637

GAUGE

Victor J. Zalanskas, West Lynn, Mass.

Application January 15, 1947, Serial No. 722,273

2 Claims. (Cl. 33—170)

This invention relates to a new and improved height gauge and more particularly and specifically to a micrometer of which the following is a specification.

The primary object of this invention resides in the provision of a micrometer height gauge which is at least 20% more accurate than those gauges of this type now in use, and a gauge having an easy, rapid, and more accurate means of measurement than those gauges now in use.

Another object of this invention resides in the provision of a height gauge of the character described which is extremely useful by mechanics and others for measuring the dimensions of articles in the course of or while in the process of manufacture, and a gauge which possesses minute accuracy provided by the finest and most delicate adjustments made possible by the numerous adjusting means of this gauge.

Still another object of this invention is the provision of a height gauge of the character set forth which is without lost motion because of the provisions made for compensation for any and all wear that may occur with the use of the instrument.

Still a further improvement and object of this invention is the provision of a height gauge of the character described which is of simple and inexpensive design, and which may be quickly and accurately used to read minutely accurate measurements of desired articles or the like.

Further improvements and advantages of this invention will readily appear to those skilled in the art when the following description is read in the light of the accompanying drawings in which:

Fig. 2 is a back elevation of the gauge.

Fig. 3 is a horizontal section taken on line 3—3 of Fig. 1.

Fig. 4 is a partial vertical section taken on line 4—4 of Fig. 1.

Fig. 5 is a horizontal section taken on line 5—5 of Fig. 2.

Fig. 6 is a horizontal cross section taken on line 6—6 of Fig. 1.

Figure 1:
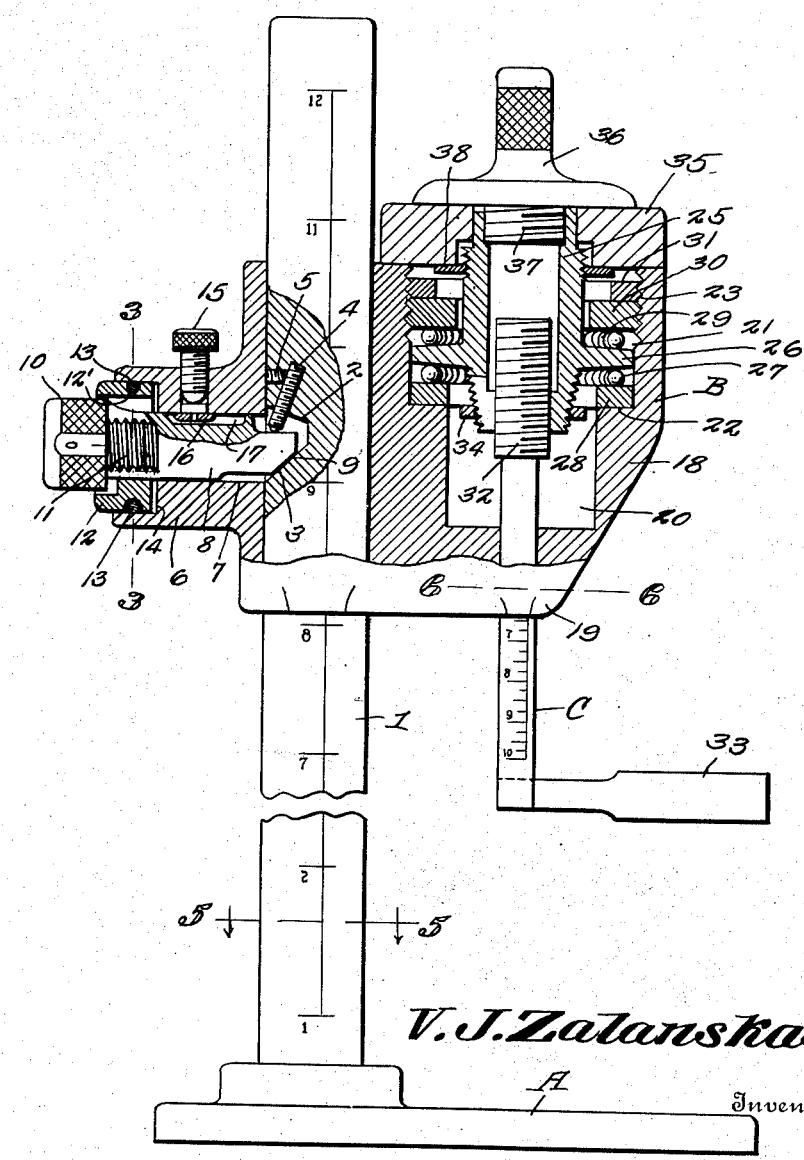
Fig. 1 is a side elevation in partial vertical section of the height gauge.

Referring now to the accompanying drawings which illustrate the preferred embodiment of this invention and in which like numerals indicate similar parts throughout A designates a set horizontal base member adapted to lie horizontally on any desired flat surface for the purpose of supporting the height gauge thereabove which is to be described in the following paragraphs.

A triangular elongated slide bar 1, which is adapted to be rigidly set into and supported perpendicularly from the base A, is provided with elongated oval slot 2 provided in the back flat surface of the bar at vertical spaced distances one inch apart. These slots are provided with inwardly tapered walls 3 which carry in their upwardly disposed wall a set screw 4, which is abutted by a second set screw 5 set horizontally into the wall in the same vertical plane with the set screw 4 in such a manner so that set screw 5 controls the ability of the set screw 4 to be adjusted vertically from within its slot 2.

A housing assembly B for the micrometer adjustments is adapted to be vertically slidably carried by the triangular slide bar 1, and has an extended flange 6 outwardly disposed from the rear flat face of the bar which is provided with a circular bore 7 which extends inward thereof and opens into the flat face of the bar 1. A plunger 8 provided with a tapered end 9 at one end thereof is adapted to be inserted into the bore 7 the lower surface of the inner end thereof being beveled at 9 for contact with the lower tapered wall 3 of the selectively engaged slots 2 in such a manner that inward movement of the plunger 8, moves the housing B vertically, adjusting the housing on the slide bar 1. After the proper adjustment has been made, the set screw 4 is operated to rigidly secure the housing B to the bar 1 at a height desired by the selection of the slot 2 from the plurality of spaced slots. The outer end of the plunger 8 is provided with a knurled knob 10 which is adapted to be positioned without the bore 7, the plunger being also formed with mutilated threads disposed on opposite sides of the plunger 8 the threads being so arranged that they will cooperate with the threads of the collar 12, preventing movement of the plunger 8. The internally threaded collar 12 is formed with an annular groove 12' in which the pins 13 are mounted, the collar being disposed within the stepped-out enlargement 14 of the outer end of the bore 7 in such a manner as to permit of rotation thereof to disengage the threads of the plunger and allow the plunger to be withdrawn to disengage the slide bar 1 and permit the housing to be slid along the slide bar 1 for a quick adjustment. A set screw 15 is extended inwardly through the flange 6 from without with its inwardly disposed end adapted to engage a key 16 which is carried internal the bore 7 in a slotted channelway 17 provided in the upper surface of the plunger 8 in such a manner as to force the key tightly against the plunger thereby preventing its rotation and removal from its slot engaging position.

Vertical adjustment of the set screw 4 disposed with one end within the slot 2 in abutment with the upper surface of the plunger 8 provides for minute adjustments for the vertical disposition of the housing B above the base A.

That part of the housing B disposed on the opposite side of the triangular bar 1 from the flange 6 consists of a circular housing 18 which tapers downwardly to form a substantially narrow bottom 19 thereon. A central enlarged hollow bore 20 is provided downwardly from the top of the housing 18 and is also provided with a partially enlarged section 21 thereof extending downwardly from the top of the housing for substantially one-half the depth thereof terminating in a horizontal shoulder 22. The upper internal wall of this enlarged bore 21 is provided with internal threads 23 thereon which originate at the upper open end of the housing and extend downwardly for substantially one-half the depth of the enlarged bore 21.

A hollow sleeve 25 which is provided with a circular flange 26 thereabout of the same diameter as the enlarged bore 21 is adapted to be placed downwardly within the housing 18 so that the flange 26 rests on a ball bearing 27 which is carried by a washer 28 which rests on the shoulder 22 thus adapting the rotation of the sleeve within the housing 18 on the bearings 27. A second set of bearings 29 is placed on the upper surface of the flange 26 and a threaded washer 30 is screwed downwardly into the housing 18 to rest on the bearings 29 thus forming double bearing guide for the rotation of the sleeve 25 within the housing 18. A second lock washer 31 is screwed downwardly into contact with the upper surface of the washer 30 to maintain it in place.

The lower end of the sleeve 25 is threaded externally in a split end which is provided with an internally threaded bore adapted to vertically receive the threaded end 32 of a vertically carried plunger screw C which extends downwardly through a provided sliding fit in the bottom of the housing 18 to extend for a desired distance therebelow where it terminates in a horizontal measuring bar 33, the plunger C being adapted for vertical adjustment only, its fit in the lower end of the housing 18 preventing its rotation. That portion of the plunger C which extends below the housing 18 is provided with a vertical scale thereon each division of the scale representing .025 inch. A lock washer 34 is threaded upwardly over the split end of the sleeve 25 adapted to tighten or loosen the split end thereof for accurately adjusting the threaded fit of the threaded end 32 of the plunger C therein.

A circular tumbler 35 is adapted to be inserted over the upper open end of the sleeve 25 to rest on the upper flat surface of the housing 18 to form a guide at the upper end of the sleeve for its rotation within the housing 18. This tumbler is adapted to rotate easily with the sleeve 25 on the upper surface of the housing 18, being so rotated by a cap 36 which is provided with a threaded shank 37 which extends downwardly into the open end of the sleeve 25 in threaded engagement therewith with its under surface in a tight unlocking fit with the upper surface of the tumbler 35 thereby adapting the rotation of the tumbler by the rotation of the cap 36. The outer surface of the circular tumbler 35 is provided with a scale which may be of the vernier type and being read by its relationship with an index mark carried on the upper outer surface of the housing 18 in a readily visible position. Thus by the rotation of the cap 36 and the tumbler 35 the plunger C is raised and lowered within the sleeve 25 thus giving a reading on the scale carried by the plunger C relative to an index carried at the lower end of the housing 18, while a second reading is obtained by the relationship of the scale carried on the tumbler 35 relative to the index mark on the housing 18 adjacent said scale.

A lock nut 38 is provided about the sleeve 25 at its upper end in threaded engagement therewith adapted to abut with the underside of the tumbler 35 thereby enabling the vertical adjustment of the tumbler 35 above the top surface of the housing 18 when wear of the bearings or of the flange 26 adjacent the bearings causes a downward fall of the sleeve 25 within the housing 18. A further adjustment carried by the gauge is a set screw 39 carried by the housing 18 in the aperture 40 carried horizontally in the housing 18 to open into abutment with a clamp guide 41 adapted to abut with the lower end of the plunger C adapting the permanent position desired above the base A.

The readings of this height gauge are taken in three steps. The first reading characteristic is taken from the slot on the slide bar below that engaged by the plunger, the lower slot lining up with the lower edge of the housing thus giving the inch characteristic to the figures.

The second characteristic is read from the scale on the plunger C on which each division represents .025 inch being read from index mark on the housing 18 adjacent the plunger C.

The third characteristic is read from the scale on the tumbler 25 from that division adjacent the index on the housing 18. Each of the divisions on the scale representing .001 inch thus completing a three decimal characteristic numeral.

It can be understood that a vernier scale may be substituted for the .001 inch scale on the tumbler.

Thus it can be seen that a very accurate micrometer height gauge is provided which is accurate and easily read because of the greatly spaced apart scales.

It may also be seen that a height gauge has been provided which has all the necessary adjustments for maintaining absolute accuracy of the gauge at all times and a gauge which is durable in use and simple in design.

Having thus described and explained this invention in construction and function and with full belief that changes in size, shape, and general characteristics would not constitute departure from this invention what I claim is:

1. A height gauge of the character described, comprising a flat horizontal base, a triangular slide bar rising from said base, a housing having a vertical opening, fitted over said slide bar for vertical sliding movement on said bar, said slide bar having a plurality of transversely elongated slots extending inwardly from one edge thereof arranged in predetermined measured spaced relation with respect to each other, each slot having a downwardly and outwardly inclined lower surface, a hollow flange formed integral with the housing, in which the triangular slide bar extends, a plunger operating horizontally through the hollow flange, said plunger having a beveled lower surface at its inner end movable over the inclined lower surface of the slot in which the plunger moves, adjusting the housing longitudinally of the slide bar, stops embodying screws threaded in an opening formed in the upper surface of each of said slots of the slide bar adapted to engage said plunger moving therein, securing the plunger in its positions of adjustment, along the slide bar, a set screw engaging each of said stops, holding said stops in their positions of adjustment, a vertically movable plunger supported by the housing, a contact measuring bar extending laterally from the vertically movable plunger, and means for operating the vertically movable plunger, independenty of the first mentioned plunger.

2. A height gauge of the character described, comprising a horizontal base, a vertical slide bar rising from the base, said bar having a plurality of slots elongated transversely and extending inwardly from one edge of the bar, the slots having inclined lower surfaces, a housing mounted on the slide bar for movement longitudinally of the slide bar, a hollow flange formed integral with the housing, said hollow flange being disposed adjacent to and opening into contact with said bar surface, a plunger movable in the hollow flange, said plunger having a beveled inner lower surface engageable with the inclined surface of the slot of the slide bar in which the plunger moves, adjusting the housing longitudinally of the slide bar, said plunger having a threaded end, a threaded knob on the threaded end of the plunger whereby said plunger is moved towards and away from the slide bar, set screws disposed within the openings of the slide bar, said set screws adapted to engage the inner end of the plunger extended into an opening of the slide bar, securing the plunger in its positions of adjustment, and limiting upward movement of said plunger, a set screw engaging the first mentioned set screw, securing the first mentioned set screw against accidental movement, and a measuring bar supported by said housing.

VICTOR J. ZALANSKAS.

REFERENCES CITED

The following references are of record in the file of this patent:

UNITED STATES PATENTS

| Number | Name | Date |
|---|---|---|
| 672,622 | Isherwood | Apr. 23, 1901 |
| 1,186,364 | Allington | June 6, 1916 |
| 1,818,853 | Joriot | Aug. 11, 1931 |
| 2,207,396 | Edelen | July 9, 1940 |
| 2,400,715 | Sandberg | May 21, 1946 |

FOREIGN PATENTS

| Number | Country | Date |
|---|---|---|
| 17,654 | Sweden | Aug. 25, 1903 |
| 395,514 | Great Britain | July 20, 1933 |